United States Patent [19]

Kuwayama et al.

[11] Patent Number: 5,500,713
[45] Date of Patent: Mar. 19, 1996

[54] COLOR PRINTER FOR PRINTING PHOTOGRAPHS

[75] Inventors: Masahiko Kuwayama, Urawa; Yoshihiro Yamamoto, Tokyo, both of Japan

[73] Assignee: Samsung Aerospace Industries, Ltd., Changwon, Rep. of Korea

[21] Appl. No.: 310,872

[22] Filed: Sep. 23, 1994

[30] Foreign Application Priority Data

Sep. 24, 1993 [JP] Japan ................................. 5-056527 U

[51] Int. Cl.$^6$ ................................................. G03B 27/60
[52] U.S. Cl. ................................................. 355/27
[58] Field of Search .............................. 355/29, 32, 35, 355/71, 27; 359/889, 890

[56] References Cited

U.S. PATENT DOCUMENTS 4,653,902  3/1987  Hester ........................................ 355/32
4,769,677  9/1988  Matsumoto ................................ 355/38
5,307,114  4/1994  Nitsch et al. ............................. 355/29

Primary Examiner—Howard B. Blankenship
Assistant Examiner—D. P. Malley
Attorney, Agent, or Firm—Morgan & Finnegan

[57] ABSTRACT

A printer for printing a photograph which includes an exposing portion, a processing portion, a collecting portion, and an optical system is provided. The optical system includes a light source, color filters for color-correcting light from the light source in a light passing area, and a light diffusion box for diffusing the light transmitted from the color filters. The color filters in the optical system each include a pair of opposing filter members for interposing the light passing area. The pair of filter members are installed so as to be movable toward/away from each other and to thereby be superposed/detached. Moreover, the central portion of the opposing front ends of the pair of filter members are convex in the direction of superposition.

1 Claim, 3 Drawing Sheets

COLOR PRINTER FOR PRINTING PHOTOGRAPHS

BACKGROUND OF THE INVENTION

The present invention relates to a color printer for printing a photograph, and more particularly, to a color printer for printing a photograph, which has a color filter with an improved structure.

FIG. 1 shows a schematic configuration of a general printer for printing a photograph. A holder 12 of a roll 2 of sensitized photographic paper is located in the upper left side of the body 1 of the printer as shown in FIG. 1. A tray 18 for receiving sheets of sensitized photographic paper is provided in the upper right side of the body 1 of the printer. The photographic paper 3 proceeds in the direction of an exposing portion 13 and a processing portion 16 which are provided between the roll holder 12 and the tray 18. A cutter 17 is located near the tray 18. The exposing portion 13 is positioned near an optical system (discussed below) and is constructed vertically so as to be able to expose the photographic paper as the paper proceeds downward vertically. The processing portion 16 which is used to develop and fix the exposed photographic paper, includes a plurality of feeding rollers and a processing chamber. A cavity 14 in which the exposed photographic paper resides temporarily is provided under the exposing portion 13.

The optical system comprises a light source 4 for generating light which exposes the photographic paper, a color filter 5 for transmitting specific colored light emitted from the light source 4, and a light diffusion box 6 for uniformly diffusing and advancing the light passing through the color filter 5. A negative film carrier 8 (hereinafter referred to as film carrier) and a table 7 for supporting the film carrier are located above the light diffusion box 6. An enlarging lens 9 for enlarging an optical image of the light passing through the film is provided above the table 7. A shutter 10 for controlling the passage of the light passed through the enlarging lens 9 is located above the enlarging lens 9. A mirror 11 for reflecting the light passing through the shutter 10 to the exposing portion 13 is installed above the shutter 10.

In a typical exposure, the light from the light source 4 becomes an image light by passing through the negative film of the film carrier 8. The image light passes through the enlarging lens 9 and reaches the photographic paper 3 via the mirror 11, forming an image on the photographic paper 3. In forming the image on the photographic paper 3, the formation time or exposing time depends on the opening time of the shutter 10.

FIG. 2 is a detailed view of the light diffusion box 6 and the color filter 50 of FIG. 1. Referring to FIG. 2, the light diffusion box 6 is located above a filter box 20. The light diffusion box 6 includes a housing with a mirror-processed interior, a diffusion plate 22 coupled to the top of the housing, and a glass plate 21 coupled to the bottom of the housing. Fine diamond formations are formed on the surface of glass plate 21. A film 25 supported by the film carrier 8 as shown in FIG. 1 is located above the light diffusion box 6.

Two sets (50 and 50') of color filters are provided inside the filter box 20. The upper color filter 50 is constructed to have a pair of opposing filter members 5b. This pair of filter members 5b is movably supported in the direction in which the two filter members are superposed on or detached from each other by an appropriate driving means and guiding means. The lower color filter 50' also has a pair of opposing filter members 5a. This pair of filter members 5a is movably supported in the direction in which the two filter members are superposed on or detached from each other, the same as members 5b of the upper color filter 50.

In the arrangement of the two sets of color filters 50 and 50', the upper color filter 50 may be a magenta filter with the lower color filter 50' being a yellow filter, or vice versa. This configuration may also include a cyan filter.

FIG. 3 is a plan view of a conventional color filter 50. Referring to FIG. 3, a pair of filter members 5 of the color filter 50 are basically rectangular. However, the central portion of the opposing ends (hereinafter referred to as the front ends) on the side which first overlaps when the filter members 5 move in the direction of superposition, is cut in the shape of a concave triangle. Each of the filter members 5 can move from a position in which they are opposingly spaced apart as indicated by phantom line 5A, to a position in which they are superposed on each other. In the latter position, the filter members 5 interpose a "light passing area" 30 through which light emitted by a light source 4 (refer to FIG. 1) passes.

When filter members 5 move in the direction of superposition, the front ends of the two filter members 5 first overlap the four corners of the light passing area 30. Thereafter, the front ends of the filter members 5 are superposed so that two triangular overlapping portions (c) (demarcated by both front end edges 51 of filter members 5 and the side edges of the filter members) are formed at both side edges of the light passing area 30. By doing so, a rhomboid filterless portion (b) is provided at the center of the light passing area 30. As filter members 5 continue to move in the direction of greater superposition, the overlapping portion (c) is increased gradually and the filterless portion (b) is decreased gradually. When the filter members 5 become overlapped to the utmost within a control section (a) of the color filter 50, the filterless portion (b) disappears.

In a photograph-printing color printer having such a conventional color filter 50, the filterless portion (b) (which remains until the filter members 5 overlap to the utmost) is located at the center (i.e., the point of highest luminance) of the light passing area 30. This results in a reduction in the color correction efficiency of the illumination light projected onto the film. To compensate for this, the light diffusion box 6 must be able to efficiently diffuse the illumination light transmitted via the color filter 50, otherwise color blotting will occur during printing. However, as shown in FIG. 3, the filter members 5 first enter the front portions of control section (a) via the respective corners of the light passing area 30, so that in order to efficiently diffuse light corrected by the filter members 5, the light diffusion box must be made sufficiently "long".

Therefore, in order to obtain a good-quality print (i.e., prints which are free from color blotting) using conventional filters, the light diffusion box 6 must be made sufficiently long, which impedes any attempt at miniaturizing the photograph-printing color printer.

SUMMARY OF THE INVENTION

Therefore, in order to overcome such conventional problems, it is an object of the present invention to provide a color printer for printing a photograph, which includes color filters of a shape capable of obtaining an efficient filter effect, thereby permitting the efficient diffusion of color corrected illumination light even when a "short" light diffusion box is employed.

To accomplish the object of the present invention, there is provided a photograph-printing printer comprising: an exposing portion for performing an exposure on a sheet of photographic paper; a processing portion for developing and fixing the exposed photographic paper; a collecting portion for collecting processed photographic paper; and an optical system for projecting light toward the exposing portion. The optical system includes a light source, color filters for color-correcting light emitted by the light source in a "light passing area", and a light diffusion box for diffusing the light transmitted from the color filters. The color filters in the optical system each include a pair of opposing filter members interposing the light passing area. The pair of filter members are installed so as to be movable toward/away from each other and to thereby be superposed/detached. Moreover, the central portion of the opposing front ends of the pair of filter members are convex in the direction of superposition.

In this configuration, when a pair of filter members move in the direction of superposition, the convex front ends of the filter members enter the light passing area so that the convex front ends are superposed on each other at the center of the light passing area. As the front ends of the filter members move in the direction of increasing superposition, the area of superposition increases toward the periphery of the light passing area while the colorless portion along the periphery decreases. Although an exposing light color is determined by the degree of insertion of the pair of filter members, since the superposition area of the convex front ends of the filter members are located at the center of the light passing area where luminance is highest, an excellent diffusion efficiency of color-corrected light transmitted via the color filter can be maintained.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Hereinafter, preferred embodiments of the photograph-printing printer of the present invention will be described. However, one characteristic of the present invention lies in the configuration of a color filter in the photograph-printing color printer, which will be explained with reference to the attached drawings.

Figure 1:
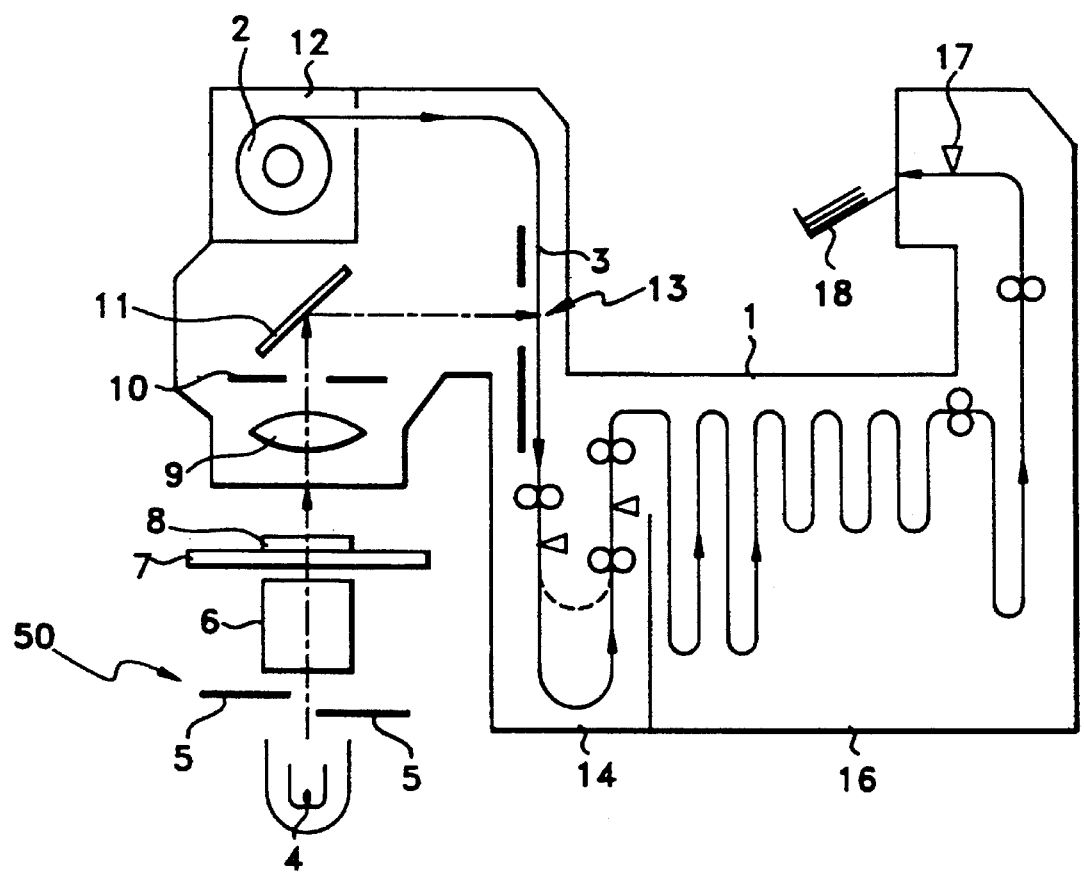
FIG. 1 is a schematic side view of a general example of a photograph-printing printer.
Figure 2:
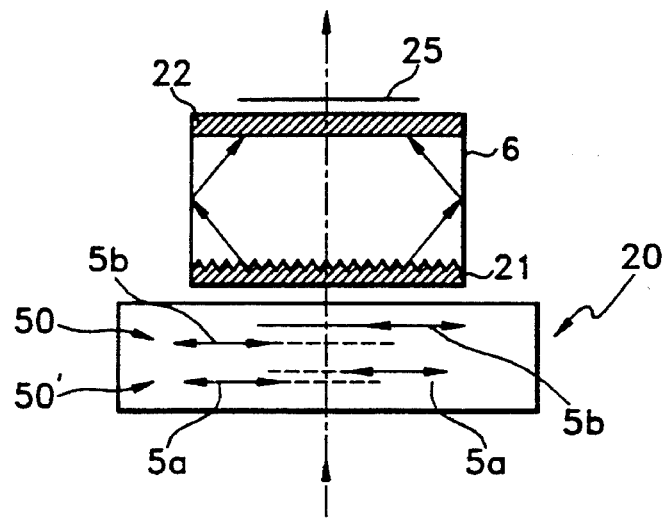
FIG. 2 is a schematic extracted side view of the color filter and the light diffusion box of the photograph-printing printer shown in FIG. 1.
Figure 3:
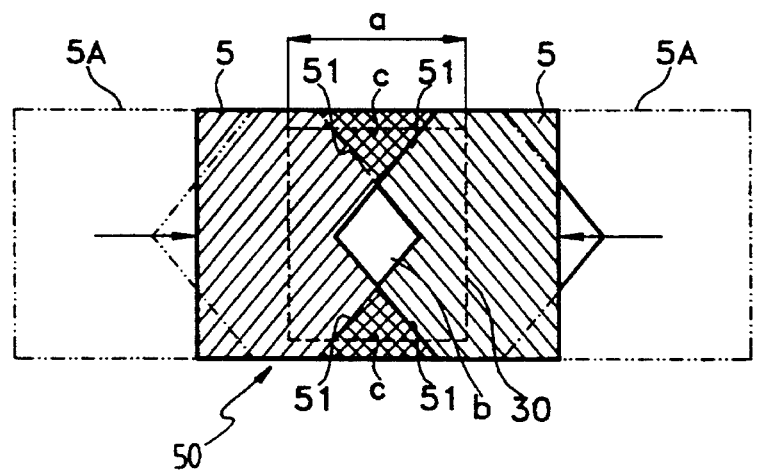
FIG. 3 is a plan view of a conventional color filter of FIG. 2.
Figure 4:
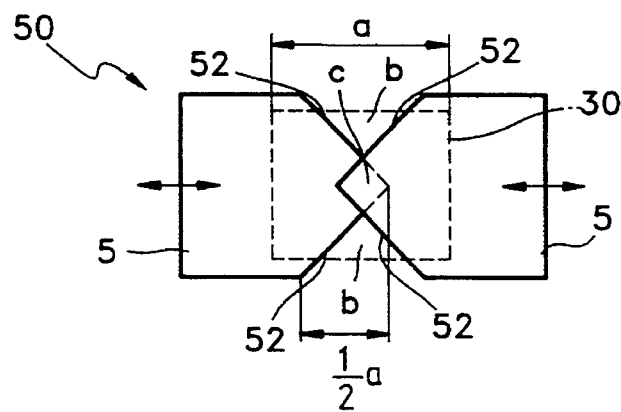
FIG. 4 is a plan view of one embodiment of a color filter employed in a photograph-printing printer of the present invention.

Referring to FIG. 4, a color filter 50 comprises a pair of filter members 5, each filter member being movably supported in the direction in which they are overlapped with or spaced apart from each other by an appropriate guiding means and driving means. This pair of filter members 5 are basically rectangular, but in order for them to overlap sooner as they move in the direction of superposition, their opposing front ends each have a right-angled isosceles triangle, thus forming the shape of the home plate of a baseball diamond. In other words, the central portion of each front end of the filter members 5 is convex in the direction of superposition. Each of the filter members 5 can move from the position where they are spaced apart from each other, to the position where they are superposed in the light passing area 30.

Reference numeral 52 indicates the opposing front ends, i.e., the convex edges of the respective filter members 5. Reference character (a) indicates a control section of the color filter. The projected length of the central portion of the filter members 5 is set as half the control section (a).

In this configuration, when a pair of filter members 5 move in the direction of superposition, the convex front ends of the filter members 5 first overlap at the central portion of the light passing area 30 from the left and right sides as depicted in FIG. 4. Consequently, the overlapping portion (c) of the front ends of the respective filter members 5 is formed rhomboidally at the central portion of the light passing area 30. Two triangular filterless portions (b) demarcated by convex edges 52 of the respective filter members 5 are formed at both side edges of the light passing area 30. As the respective filter members 5 continue to move in the direction of superposition, the overlapping portion (c) is gradually increased and thereby the filterless portions (b) are gradually decreased. When filter members 5 are overlapped to the utmost in the control area (a) of the color filter 50, the filterless portions (b) disappear.

Color-compensated illumination light is uniformly diffused by the diffusion box and is used to expose the photographic paper. Exposing light is color-compensated according to the degree to which a pair of filter members enter the light passing area 30. At least two sets of color filters 50 (each having a pair of filter members 5) are installed to serve as a yellow color damping filter and a magenta color filter, respectively. If necessary, another color filter 50 may be added to form a cyan color filter.

In this embodiment, since the convex front ends of the pair of filter members 5 are superposed from the center of the light passing area 30 where luminance is highest, the illumination light is mostly color compensated, and thus an efficient filter effect can be obtained. Further, since the filterless portion (b) is divided so as to be on either side of the edges of the control area (a), the illumination light can be efficiently diffused by the light diffusion box 6. Accordingly, even when the length of the light diffusion box 6 is "short", the light corrected by the filter members 5 can be efficiently diffused, thereby minimizing the size of the photograph-printing color printer and obtaining a good-quality print free from color blotting.

Figure 5:
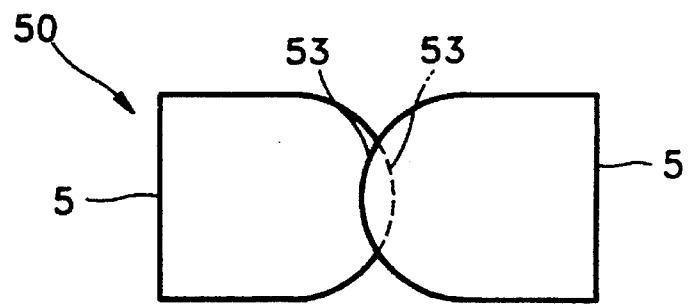
FIG. 5 is a plan view of another embodiment of the color filter employed in the photograph-printing of the present invention.

Moreover, the edges of the convex front ends of the pair of filter members 5 forming the color filter 50 need not be straight. As shown in FIG. 5, the front ends may have, for instance, hemispheric edges 53 of a predetermined curvature. In this embodiment, the same effect as that of the aforementioned embodiment is obtained.

Figure 6:
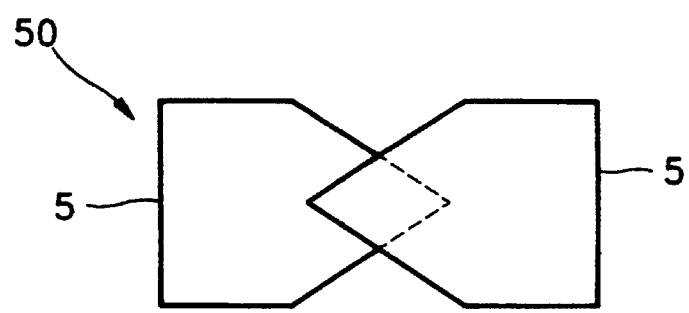
FIG. 6 is a plan view of yet another embodiment of the color filter employed in the photograph-printing printer of the present invention.

In the case in which the edges of the convex front ends of the pair of filter members 5 forming the color filter 50 are straight, the angle of the convex front ends of the filter members 5 may be acute as shown in FIG. 6.

Figure 7:
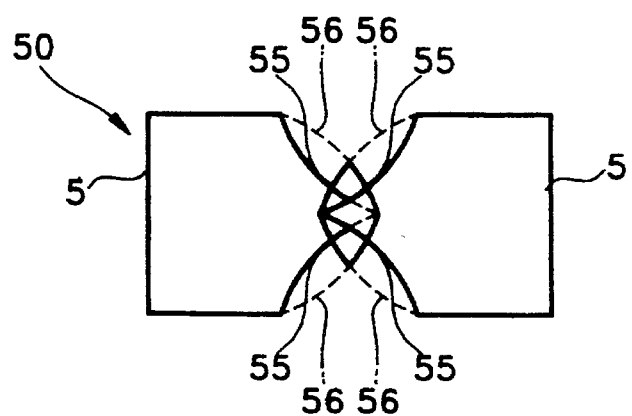
FIG. 7 is a plan view of still another embodiment of the color filter employed in the photograph-printing printer of the present invention.

In forming the front ends of the filter members 5 as a triangle, the edges of the convex front ends may be formed as a slightly concave arc as indicated by line 55 of FIG. 7. The edges of the convex front ends may alternatively be formed as a slightly convex arc as indicated by line 56 of FIG. 7. Further, one part of the convex edges may be straight while the other part thereof may have a predetermined curvature.

What is claimed

1. A photograph-printing printer comprising:

an exposing portion for performing an exposure on a sheet of photographic paper;

a processing portion for developing and fixing the exposed photographic paper;

a collecting portion for collecting processing photographic paper;

an optical system for projecting light toward said exposing portion;

said optical system comprising a light source, color filters for color-correcting light from said light source in a light passing area, and a light diffusion box for diffusing the light transmitted from said color filters;

said color filters each having a pair of opposing filter members interposing said light passing area;

said pair of filter members being installed so as to be straightly movable across the optical axis of said light passing area to thereby be superposed with each other; and wherein the central portion of the opposing front ends of said pair of filter members are protruded in the direction of superposition of said pair of filter members, so that the superposition begins from the center of said light passing area.

* * * * *